United States Patent [19]

Collin

[11] 4,170,905
[45] Oct. 16, 1979

[54] PROPULSION PLANT INCLUDING A GAS TURBINE AND A REDUCTION GEAR

[75] Inventor: Lars T. Collin, Mölndal, Sweden

[73] Assignee: Collin Consult AB, Sweden

[21] Appl. No.: 829,537

[22] Filed: Aug. 31, 1977

Related U.S. Application Data

[63] Continuation-in-part of Ser. No. 667,341, Mar. 16, 1976, Pat. No. 4,051,679, which is a continuation of Ser. No. 595,228, Jul., 1975, abandoned, which is a continuation of Ser. No. 422,845, Dec. 7, 1973, abandoned.

[30] Foreign Application Priority Data

Dec. 8, 1972 [SE] Sweden ........................... 16003/72

[51] Int. Cl.² .................. F16H 37/06; F16H 3/08
[52] U.S. Cl. ........................ 74/661; 74/370; 74/355
[58] Field of Search ............ 74/661, 665 R, 665 A, 74/665 B, 369, 370, 355, 377; 60/39.16 R, 39.16 S

[56] References Cited

U.S. PATENT DOCUMENTS

| | | | |
|---|---|---|---|
| 1,958,336 | 5/1934 | Greene | 74/370 X |
| 2,741,351 | 4/1956 | Fletcher et al. | 115/34 R X |
| 2,742,798 | 4/1956 | Niederhauser | 74/661 |
| 2,822,704 | 2/1958 | Sinclair | 74/661 |
| 2,860,713 | 11/1958 | Peterson | 74/661 UX |
| 2,873,620 | 2/1959 | Sinclair | 74/661 |
| 3,037,348 | 6/1962 | Gassmann | 60/39.16 S |
| 3,194,087 | 7/1965 | Kronogard | 74/665 B X |
| 3,306,036 | 2/1967 | Wooler | 74/661 X |
| 3,388,684 | 6/1968 | Gros et al. | 74/665 A X |
| 3,388,748 | 6/1968 | Jung | 74/661 X |
| 3,744,241 | 7/1973 | Muller et al. | 74/661 X |

FOREIGN PATENT DOCUMENTS

510984  12/1920  France ........................ 74/370

Primary Examiner—C. J. Husar
Assistant Examiner—Lance W. Chandler
Attorney, Agent, or Firm—Holman & Stern

[57] ABSTRACT

A reversing gear connecting a gas turbine to a propulsion shaft includes a big-diameter first gear wheel rotatable with the propulsion shaft and two pinions meshing therewith. There are further two intermeshing gears, one aligned with each of the pinions. One of the pinions has a through bore, permitting the passage of the output shaft from the turbine, a two-way clutch between this first pinion and its aligned gear, to connect, at will, last mentioned gear to the output shaft, or said shaft to the first pinion, the other pinion and its aligned gear being permanently interconnected.

1 Claim, 2 Drawing Figures

PROPULSION PLANT INCLUDING A GAS TURBINE AND A REDUCTION GEAR

REFERENCE TO RELATED ART

This application is a continuation-in-part of my application Ser. No. 667,341 dated Mar. 16, 1976, that application being a continuation of my application Ser. No. 595,228 filed July 11, 1975 (now abandoned) which in turn is a continuation of my application Ser. No. 422,845 (now abandoned) dated Dec. 7, 1973.

BACKGROUND OF THE INVENTION

When designing high output marine propulsion machineries, the reversing has hitherto been a limiting factor, Certain engine types of prime movers are designed to be directly reversible so they can supply the required output in both directions of rotation. Other machineries, as for instance turbines, do not possess such properties, while, with a third type, reversing is possible, constructional and operational complications make it more convenient to reverse by other means than the power unit itself.

Many gears with reversing facilities are very expensive, and have, for that reason, mainly been installed in warships. With steam turbines, the reversing problem has been solved by providing separate astern-turbines. Reversible gears have been proposed, in which the torque is transferred to different combinations of gears by means of hydraulic clutches being filled and emptied, and in turn connecting the machinery to the propeller via different gearways.

It has also been proposed, during a reversing operation, to reduce the torque acting upon the gear to about zero, by means of brakes mounted at the propeller shaft. As long as the ship is moving through the water, the propeller must also be braked which imposes a heavy load upon the brake.

SUMMARY OF THE INVENTION

The present invention relates to marine propulsion plants, in which the prime mover is a gas turbine, and which includes a reversing gear comprising a first part mechanically connected to the turbine and a second part connected to the propeller shaft, as well as means to maintain said parts in either of two different working conditions, for ahead and astern running, respectively. The plant is provided with means to govern the flow of motive fluid to the turbine, as well as means for braking the turbine and the part of the reversing gear connected thereto. The turbine rotor is carried in bearings permitting the rotation thereof in two different directions, and there are means at the reversing gear permitting transfer of torque the usual way from the turbine to the propeller shaft, but also in the opposite direction.

The parts of the reversing gear are designed in such a manner, that the turbine rotor and the gear part donnected thereto will, in use, represent a considerably smaller inertia than the propeller shaft and the rotatable elements connected thereto, which means that it will be comparatively easy to brake the turbine after removing the supply of motive fluid thereto, and to re-engage the gear parts. The turbine will then be forced to rotate "backwards" by the inertia of the propeller shaft, but the latter will first be braked and then brought to rotate in the new direction, when motive fluid is reapplied to the turbine.

The reversing/reduction gear includes a big-diameter gear wheel mounted upon the propulsion shaft and two pinions meshing therewith. Two further intermeshing gears are provided, one aligned with each of the pinions. One pinion has a through bore permitting the passage of the output shaft, and a two way clutch is provided between this first pinion and its aligned gear. The clutch contains a first part connected to the output shaft, and a second part which, at will, may be brought into contact with the first pinion or alternatively with its aligned gear. In this manner power may be transferred to the big gear wheel by either of the two pinions to make the big gear wheel rotate in either direction.

When the gear is disengaged, only an insignificant portion of the total reduction gear remains with the turbine, which in this way will be easily braked for reversing manoevers.

The big-diameter reduction gear makes it possible to connect a number of gas turbine units to the same propulsion shaft.

BRIEF DESCRIPTION OF THE PREFERRED EMBODIMENTS

Figure 1:
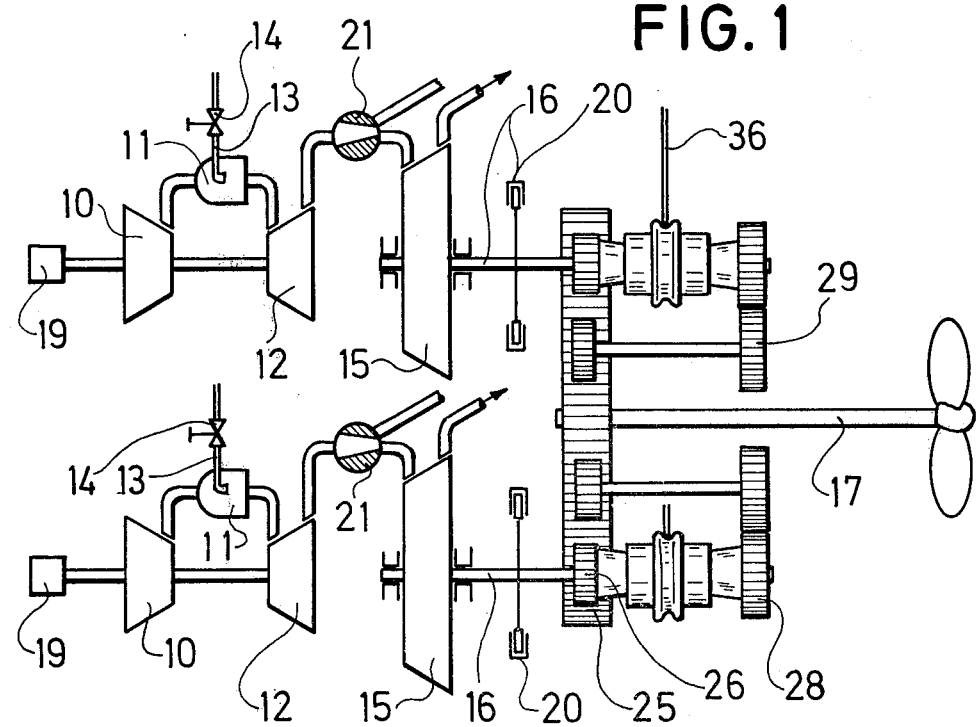
FIG. 1 shows schematically a marine propulsion plant including a gas turbine and a reversing/reduction gear.

The marine propulsion plant illustrated in FIG. 1 includes two gas turbine units, each comprising a gas generating portion including a compressor 10, a combustion chamber 11 and a first turbine 12 driving the compressor. The combustion chamber is provided with a burner 13 having means 14 for governing the supply of fuel. A main, or propulsion turbine is denoted by 15. The output shaft 16 of the main turbine 15 is connected to the propeller shaft 17 by means of reduction gear generally denoted by 18, to be described in detail hereinbelow in connection with FIG. 2. A motor for starting the gas generating unit is denoted by 19.

Means for braking the main turbine 15 is indicated at 20 and may be of arbitrary known type.

Certain types of gas generator units cannot be completely shut down during reversing, but must continue to generate some amount of gas. In order to prevent motive fluid being supplied to the main turbine 15 during the braking step, a bleed-off valve 21 is provided, by means of which any desired amount of motive fluid may be made to by-pass the main turbine.

The main steps involved in a reversing operation are as follows: First of all, the supply of motive fluid to the turbine is cut off, and thereafter the driving connection at the reversing gear is disengaged. The movement of the ship through the water will continue, and the propeller will, acting as a water turbine, drive the propeller shaft and the part of the gear mechanically connected thereto in the same direction as before.

The inertia of the turbine and the part of the gear mechanically connected thereto will also make these parts continue to rotate in the same direction as befo but no, or only an insignificant amount of power is supplied thereto, so the speed will be rapidly reduced.

The brake 20 is then applied and the turbine rotor is brought to stand still, or almost so.

It will now be possible gradually to engage the reversing gear. The propeller shaft system is still rotating in the original direction, and an engagement will bring the turbine part of the gear to roatate "backwards." This imposes a load on the propeller shaft, which reduces its tendency to rotate.

Thereafter motive fluid is supplied to the turbine, which now rotates contrary to its normal working direction. The action of the motive fluid upon the rotor buckets will first fully brake the now interconnected system from the turbine to the propeller, and finally bring this to rotate in the new direction of rotation.

It is necessary to provide a considerable reduction of the speed between the fast running turbine and the slowly rotating propeller shaft. As mentioned above, it is also necessary to provide for a braking of the turbine during reversing manoevers, and to facilitate that the parts of the reversing gear, permanently connected to the turbine output shaft ought to be as small as possible, to provide a low inertia.

Figure 2:
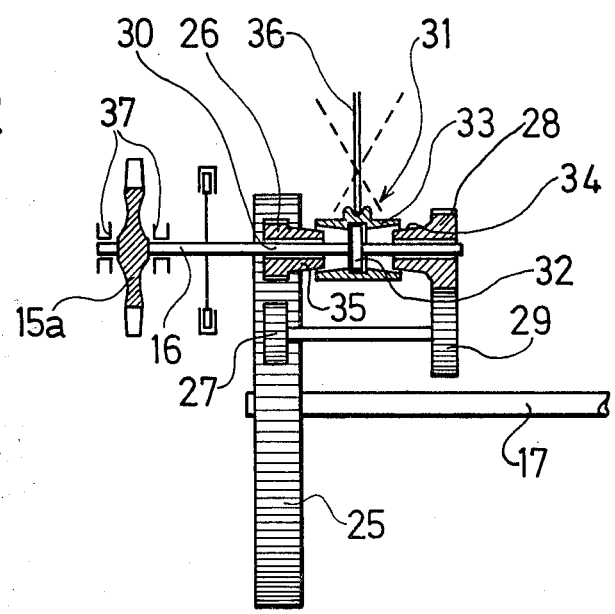
FIG. 2 shows, on a larger scale, the design of a reversing/reduction gear.

A reduction gearing of the type shown in FIG. 1, and generally denoted by 18, is shown in more detail in FIG. 2, the rotor of one of the turbines and its pertaining parts of the reduction gearing being illustrated only.

The reduction gearing includes a big-diameter gear wheel 25 or first gear fitted at the inward end of the propeller shaft 17, and there are two pinions 26 and 27 engaging the same and forming second and third gears, respectively. Two inter-meshing gear wheels 28, a fourth gear, and 29, a fifth gear, are provided at the side of the big wheel 25 remote from turbine 15, the rotor of which in FIG. 2 is denoted by 15a.

Gear wheel 29 is directedly connected to pinion 27, but there is no direct mechanical connection between gear wheel 28 and pinion 26.

The output shaft 16 of turbine 15 is provided with a brake 20 of the disc type, and is continued to a quill shaft 30 passing through a bore in pinion 26 and gear wheel 28. Intermediate last mentioned elements there is a clutch device 31 of the two-part type. This clutch includes a first part 32 mounted upon the quill shaft, and a second tubular part 33 enclosing the first part, being axially displaceable in relation thereto, but rotatingly engaging the same.

Gear wheel 28 and pinion 26 are each provided with a truncated cone projection, 34 and 35, respectively, and the second clutch part 33 is provided with mating internal end faces. Means, very schematically denoted by 36, will make it possible, at will, to displace the second clutch part axially for engagement either with pinion 26, or with gear wheel 28.

On the first occasion power will be transferred from quill shaft 30 to big-diameter wheel 25 by way of pinion 26 only. On the other occasion power will be transferred thereto by way of gear wheel 28 and the locked wheel 29 and pinion 27, That will cause propeller shaft 17 to rotate in a direction opposite to that caused by the engagement by way of pinion 26.

The second part may also be brought to an intermediate, neutral position disengaging pinion 26 as well as gear wheel 28. This is the position used while braking the turbine during reversing manoevers, and it is evident that on such occasion only the quill shaft and the clutch will continue to rotate together with the turbine, resulting in a smallinertia rotating turbine body.

The procedure during reversing has been explained above. The clutch is brought to a neutral position, the gas supply is cut off and the turbine is braked, while the parts of the gearing connected to the propeller shaft continue to rotate in the same direction as before.

When the rotation of the turbine has stopped, the clutch is slowly slipped into a position oppositely to that occupied during the previous engagement, which brings the turbine to be driven "backwards" by the inertia of gearing connected to the propeller shaft.

Gas is then supplied to the turbine, whereby a forceful braking action upon the gearing is first obtained, and the turbine is finally brought to rotate in its proper direction, whereby the propeller shaft, due to the reversed position of the clutch will be made to rotate in a direction opposite to that before hand.

The bearings 37 carrying the turbine rotor will have to be designed so they will permit such two-way rotation of the turbine shaft, which is not common with conventional turbines.

The clutch shown is very schematic for illustrating the desired function only, and modifications within the known art will be evident to a man skilled in the art.

This type of reduction gearing, having a big-diameter gear wheel, further has the advantage of permitting the use of a number of small gas turbine units, instead of a single large unit. This is favourable with respect to space requirements for the plant, and furthermore makes possible a more econonomic running of the plant during part load, by cutting out some unit, or units.

I claim:

1. A propulsion plant including a propulsion shaft, a gas turbine having a rotor and an output shaft, means mounting said output shaft for rotation in opposite directions, means for supplying motive fluid to the turbine rotor, and a reversing gear means for connecting the turbine output shaft to the propulsion shaft, said reversing gear means including a first gear rotatable with the propulsion shaft, second and third gears each meshing with said first gear, said second and third gears being of smaller diameter than said first gear, intermeshing fourth and fifth gears, said fifth gear being axially aligned with said third gear and having a permanent driving connection therewith, said second gear being axially aligned with said fourth gear, said second gear having a bore formed therethrough, the turbine output shaft passing through said bore, a two-part clutch means associated with said output shaft intermediate said second and fourth gears, a first part of said clutch means being connected to the output shaft for rotation therewith, means for axially displacing a second part of said clutch means into engagement with either of said second or fourth gears to form a driving connection between said output shaft and said second or fourth gears, respectively, and a brake for said turbine output shaft.

* * * * *